United States Patent
Dewachter (10) Patent No.: US 9,162,204 B2
(45) Date of Patent: *Oct. 20, 2015

(54) PROCESS FOR IMPROVING THE POLYMERIZATION OF ETHYLENE AND ONE OR MORE OPTIONAL COMONOMER(S) IN A POLYMERIZATION LOOP REACTOR

(71) Applicant: TOTAL RESEARCH & TECHNOLOGY FELUY, Seneffe (BE)

(72) Inventor: Daan Dewachter, Mechelen (BE)

(73) Assignee: TOTAL RESEARCH & TECHNOLOGY FELUY, Seneffe (Feluy) (BE)

( * ) Notice: Subject to any disclaimer, the term of this patent is extended or adjusted under 35 U.S.C. 154(b) by 189 days.

This patent is subject to a terminal disclaimer.

(21) Appl. No.: 13/693,501

(22) Filed: Dec. 4, 2012

(65) Prior Publication Data

US 2013/0095001 A1   Apr. 18, 2013

Related U.S. Application Data

(62) Division of application No. 12/295,855, filed as application No. PCT/EP2007/053272 on Apr. 3, 2007, now Pat. No. 8,367,783.

(30) Foreign Application Priority Data

Apr. 3, 2006 (EP) ................... 06112155

(51) Int. Cl.
*F01N 3/20* (2006.01)
*B01J 19/00* (2006.01)
(Continued)

(52) U.S. Cl.
CPC .. *B01J 8/08* (2013.01); *B01J 8/007* (2013.01); *B01J 19/18* (2013.01); *C08F 10/02* (2013.01);
(Continued)

(58) Field of Classification Search
CPC ............. B08J 8/007; B08J 19/18; B08J 8/08; B08J 2219/00094; B08J 2219/00164; C08F 10/02; C08F 2/001; C08F 2/14; C08F 110/02; C08F 210/16; C08F 210/14
USPC ..................... 422/132, 105, 131; 526/64, 348
See application file for complete search history.

(56) References Cited

U.S. PATENT DOCUMENTS

2005/0272891 A1* 12/2005 Fouarge et al. ............... 526/943

FOREIGN PATENT DOCUMENTS

WO    2005/080442 A1    9/2005

OTHER PUBLICATIONS

Office Action issued in Indian Application No. 4424/KOLNP/2008 dated Jul. 16, 2013 (1 page).

*Primary Examiner* — William Cheung (57) ABSTRACT

The present invention relates to a process for improving the polymerization of ethylene and one or more optional co-monomer(s) in a polymerization loop reactor characterized in that said process comprises the step of controlling the hydrogen/monomer ratio along the path of the reactor by multiple, spatially separated, feeding of hydrogen along the path of the loop reactor. In particular, the invention provides a process for controlling, and preferably narrowing, the molecular weight distribution of the produced polymer particles. In another aspect, the invention relates to a polymerization loop reactor suitable for the polymerization process of ethylene and an optional olefin co-monomer, wherein the molecular weight distribution of the produced ethylene polymer can be controlled.

13 Claims, 4 Drawing Sheets

(51) Int. Cl.
*B01J 19/18* (2006.01)
*C08F 2/00* (2006.01)
*C08F 210/00* (2006.01)
*B01J 8/08* (2006.01)
*B01J 8/00* (2006.01)
*C08F 10/02* (2006.01)
*C08F 110/02* (2006.01)
*C08F 210/16* (2006.01)

(52) U.S. Cl.
CPC ............... *B01J 2219/00094* (2013.01); *B01J 2219/00164* (2013.01); *C08F 110/02* (2013.01); *C08F 210/16* (2013.01)

PROCESS FOR IMPROVING THE POLYMERIZATION OF ETHYLENE AND ONE OR MORE OPTIONAL COMONOMER(S) IN A POLYMERIZATION LOOP REACTOR

CROSS-REFERENCE TO RELATED APPLICATIONS

This application is a divisional application of U.S. application Ser. No. 12/295,855, filed on Sep. 1, 2009, now issued as U.S. Pat. No. 8,367,783, which claims the benefit of PCT Appl. Serial No. PCT/EP2007/053272, filed Apr. 3, 2007, which claims the benefit of European Pat. Appl. Ser. No. 06112155.4, filed Apr. 3, 2006.

FIELD OF THE INVENTION

The present invention relates to the field of olefin polymerization. In particular, the present invention relates to a process for improving the polymerization of ethylene and one or more optional co-monomer(s) in a polymerization loop reactor. In another aspect, the present invention relates to a polymerization reactor suitable for the polymerization process of a monomer and an optional olefin co-monomer.

BACKGROUND OF THE INVENTION

Polyethylene (PE) is synthesized by polymerizing ethylene ($CH_2$=$CH_2$) monomers. Because PE is cheap, safe, stable to most environments and easy to be processed polyethylene polymers are useful in many applications. According to the properties polyethylene can be classified into several types, such as but not limited to LDPE (Low Density Polyethylene), LLDPE (Linear Low Density Polyethylene), and HDPE (High Density Polyethylene). Each type of polyethylene has different properties and characteristics.

Ethylene polymerizations are frequently carried out in a loop reactor using monomer, liquid diluent and catalyst, one or more optional co-monomer(s), and hydrogen. The polymerization in a loop reactor is usually performed under slurry conditions, with the produced polymer usually in a form of solid particles, which are suspended in the diluent. The slurry in the reactor is circulated continuously with a pump to maintain efficient suspension of the polymer solid particles in the liquid diluent. The product is discharged from the loop reactor by means of settling legs, which operate on a batch principle to recover the product. Settling in the legs is used to increase the solids concentration of the slurry finally recovered as product slurry. The product is further discharged through flash lines to a flash tank, where most of the diluent and unreacted monomers are flashed off and recycled. The polymer particles are dried, additives can be added and finally the polymer may be extruded and pelletized.

Molecular properties of ethylene polymers, such as crystallinity or density, average molecular weight and molecular weight distribution (MWD) are determined by a number of factors such as nature and concentration of the reactants or polymerization conditions. The molecular weight distribution (MWD), also referred to as polydispersity, is defined as the ratio of weight average molar mass ($M_w$) divided by number average molar mass ($M_n$). MWD gives an indication of the uniformity of the degree of polymerization and thus the length and weight of the polymer chains. Thus, polymers with a lower MWD are characterized by higher uniformity than polymers with a higher MWD. In general, polyethylene polymers with narrow molecular weight distributions have greater stress cracking resistance and better optical properties. Polyethylene polymers with broad molecular weight distributions generally have greater impact strength.

Control of reactions conditions during the polymerization process for controlling the molecular weight distribution of a polymer is important but is difficult to realize in practice. During the polymerization process the concentration of reactants, including monomer, one or more optional co-monomer(s), and hydrogen, will vary and tend to decrease as the reactants are converted to form polymer in the course of the polymerization process. While reactants are depleted along the path of the reactor, fluctuations in reaction temperatures and fluctuations in reactant concentration occur along the reactor. As the length of the loop reactor increases, the concentration of reactants will tend to vary to a greater extent. The degree to which the concentration of reactants diminishes is also dependent upon the velocity of the corresponding reactions. The variation in concentration of a reactant will be more pronounced the faster the reactant is consumed during the polymerization process. This will contribute to non-uniform polymer properties. Especially hydrogen is difficult to control since the concentration of hydrogen required during polymerization is very small.

WO 2004/024782 discloses a slurry polymerization process wherein olefin monomer is fed to a continuous loop reactor at two or more feed points. This document also refers to the possibility of introducing catalyst in the loop reactor through a plurality of catalyst feeds. Further, in accordance with this document, a plurality of co-monomer feeds may be provided on the loop reactor. However, this document remains silent regarding the need of controlling the concentration of hydrogen in the polymerization reactor during polymerization.

In view of the above, there remains a need in the art to provide a process for improving the polymerization of ethylene. It is therefore an object of the present invention to provide an improved ethylene polymerization process.

More in particular, it is an object of the invention to provide a process for controlling the molecular weight distribution of ethylene polymer. It is in particular an object to provide a process for narrowing the molecular weight distribution of ethylene polymer.

It is a further object of the present invention to provide a process for controlling the concentration of reactants, and especially of hydrogen, in a polymerization reactor during polymerization.

The present invention aims to provide a polymer end product having improved compositional homogeneity. The present invention also aims to provide a polymer end product having improved quality. It is another object of the invention to provide a polymer end product having improved physical optical properties.

SUMMARY

The present invention relates in a first aspect to a process for improving the polymerization of ethylene. The process for the polymerization of ethylene monomer with one or more optional olefin co-monomer(s) in a polymerization loop reactor comprises the steps of:
  feeding ethylene monomer, one or more optional olefin co-monomer(s), and a diluent, into the loop reactor,
  feeding at least one polymerization catalyst into the reactor, polymerizing said monomer and said optional co-monomer(s) to produce a polymer slurry comprising essentially liquid diluent and solid ethylene polymer particles, and discharging said polymer slurry out of the reactor, and is in particular characterized in that said process further comprises the step of controlling the hydrogen/monomer ratio along the path of the reactor by multiple, spatially separated feeding of hydrogen along the path of the loop reactor.

In accordance with the present invention, the hydrogen/ethylene ratio is adequately controlled in the polymerization reactor, by feeding hydrogen into the reactor at multiple entries along the path of the reactor. In a preferred embodiment, the hydrogen/monomer ratio is controlled in accordance with the present process, by providing at least two spatially separated feeding entries of hydrogen along the path of the loop reactor. In another preferred embodiment, the multiple entries for feeding hydrogen are positioned equidistantly along the path of the reactor.

The applicant has shown that adequate control of the hydrogen/ethylene ratio along the path of the reactor according to the present invention enables to minimize fluctuations in hydrogen concentrations in the reactor. By maintaining the ratio of hydrogen to ethylene at a suitable level along the path of the reactor, the present process advantageously provides improved control of molecular weight and molecular weight distribution of the prepared polymers. The present process permits to narrow the molecular weight distribution of the produced polymer. The present process also enables to obtain polymers having improved optical properties. Control of the hydrogen/ethylene ratio along the path of the reactor further permits to obtain ethylene polymers having improved compositional homogeneity. Because necessary amounts of hydrogen during a polymerization process are low compared to other reactants, it is unexpected that adjustment of the hydrogen concentration during the polymerization process results in the preparation of polymer product with such improved properties.

The present process is suitable for being applied to a single loop reactor. The present process may also be applied in a double loop reactor, and in particular to the first loop and/or to the second loop of such double loop reactor.

The present invention will be further disclosed in detail hereunder. The description is only given by way of example and does not limit the invention. The reference numbers relate to the hereto-annexed figures.

DETAILED DESCRIPTION OF THE INVENTION

The present invention is especially applicable to the polymerization process of ethylene. Suitable "ethylene polymerization" includes but is not limited to homo-polymerization of ethylene or co-polymerization of ethylene and at least one olefin co-monomer. Ethylene polymerization comprises feeding to a reactor the reactants including the monomer ethylene, one or more optional co-monomer(s), a diluent, a catalyst, optionally a co-catalyst, and a terminating agent such as hydrogen.

The present polymerization process for preparing polyethylene may include a process for preparing monomodal or bimodal polyethylene. "Bimodal PE" refers to PE that is manufactured using two reactors, which are connected to each other in series, the operating conditions being different in the two reactors. Hereby polymer particles having different molecular weights will be prepared in the different reactors. "Monomodal PE" is produced in a single reactor or using two reactors in series, with identical operating conditions.

Olefin co-monomers which are suitable for being used in accordance with the present invention may comprise but are not limited to aliphatic $C_3$-$C_{20}$ alpha-olefins. Examples of suitable aliphatic $C_3$-$C_{20}$ alpha-olefins include propylene, 1-butene, 4-methyl-1-pentene, 1-hexene, 1-octene, 1-decene, 1-dodecene, 1-tetradecene, 1-hexadecene, 1-octadecene and 1-eicosene. In a preferred embodiment of the present invention, said co-monomer is 1-hexene. However, it should be clear from the present invention that other co-monomers may as well be applied according to the present invention.

Diluents which are suitable for being used in accordance with the present invention may comprise but are not limited to hydrocarbon diluents such as aliphatic, cycloaliphatic and aromatic hydrocarbon solvents, or halogenated versions of such solvents. The preferred solvents are $C_{12}$ or lower, straight chain or branched chain, saturated hydrocarbons, $C_5$ to $C_9$ saturated alicyclic or aromatic hydrocarbons or $C_2$ to $C_6$ halogenated hydrocarbons. Nonlimiting illustrative examples of solvents are butane, isobutane, pentane, hexane, heptane, cyclopentane, cyclohexane, cycloheptane, methyl cyclopentane, methyl cyclohexane, isooctane, benzene, toluene, xylene, chloroform, chlorobenzenes, tetrachloroethylene, dichloroethane and trichloroethane. In a preferred embodiment of the present invention, said diluent is isobutane. However, it should be clear from the present invention that other diluents may as well be applied according to the present invention.

As used herein, the term "polymerization slurry" or "polymer slurry" or "slurry" means substantially a two-phase composition including polymer solids and liquid. The solids include catalyst and a polymerized olefin, such as polyethylene. The liquids may comprise an inert diluent, such as isobutane, with dissolved monomer such as ethylene, a molecular weight control agent such as hydrogen, optional co-monomer(s), one or more antistatic agents, antifouling agents, scavengers, or other process additives.

The polymerization reaction may utilize highly sophisticated catalyst systems that initiate polymerization and propagate the reaction. According to the present invention the term "catalyst" is defined herein as a substance that causes a change in the rate of a polymerization reaction without itself being consumed in the reaction. The term "co-catalyst" as used herein refers to materials that can be used in conjunction with a catalyst in order to improve the activity of the catalyst during the polymerization reaction.

Suitable catalysts and co-catalysts for use in the polymerization of ethylene are well known in the art.

According to a preferred embodiment said catalyst may be a metallocene catalyst. The term "metallocene catalyst" is used herein to describe any transition metal complexes consisting of metal atoms bonded to one or two ligands. In a preferred embodiment, the metallocene catalyst has a general formula MX, wherein M is a transition metal compound selected from group IV and wherein X is a ligand composed of one or two groups of cyclopentadienyl (Cp), indenyl, fluorenyl or their derivatives. Illustrative examples of metallocene catalysts comprise but are not limited to $Cp_2ZrCl_2$, $Cp_2TiCl_2$ or $Cp_2HfCl_2$. The present process is particularly advantageous in polymerization processes wherein metallocene catalysts are applied, especially because such catalysts have a good hydrogen response.

In another embodiment, said catalyst may be a Ziegler-Natta catalyst. The "Ziegler-Natta catalyst" is preferably of the general formula $MX_n$ wherein M is a transition metal compound selected from group IV to VII, wherein X is a halogen, and wherein n is the valence of the metal. Preferably, M is a group IV, group V or group VI metal, more preferably titanium, chromium or vanadium and most preferably titanium. Preferably, X is chlorine or bromine, and most preferably, chlorine. Illustrative examples of the transition metal compounds comprise but are not limited to $TiCl_3$, $TiCl_4$.

In another embodiment the catalyst may be a metallocene catalyst or a Ziegler-Natta catalyst.

In yet another embodiment, said catalyst may be a chromium catalyst. The term "chromium catalysts" refers to catalysts obtained by deposition of chromium oxide on a support, e.g. a silica or aluminum support. Illustrative examples of chromium catalysts comprise but are not limited to $CrSiO_2$ or $CrAl_2O_3$.

It is known in the art that the hydrogen/ethylene ratio may differ at different points in a polymerization reactor and that this ratio is difficult to control during the polymerization reaction. The biggest difference in hydrogen/ethylene ratios will generally be observed between a point right before and a point right after a hydrogen feeding point. With only one such feeding point in a loop reactor this means that the slurry will have made a complete passage around the loop. The longer the reactor, the more important this ratio difference will be. As a result thereof, polymer chains that are formed near the reactor inlet (as defined at the point at which the polymerization reaction commences), and polymer chains formed near the reactor outlet may show different properties. The present invention provides a process wherein variation in the hydrogen/ethylene ratio is minimized. For that, the invention comprises the step of controlling the hydrogen/monomer ratio along the path of the reactor by providing multiple injection of hydrogen along the path of the loop reactor. The terms "path" and "flow path" of the reactor are used herein as synonyms and are defined as the internal route followed by the reactant stream and the formed polymer slurry in the reactor.

According to a preferred embodiment of the present invention, the present process comprises providing at least two feeding entries of hydrogen along the path of the loop reactor. In another preferred embodiment, the present process comprises providing at least three feeding entries of hydrogen along the path of the loop reactor. In another preferred embodiment, the present process comprises providing at least four feeding entries of hydrogen along the path of the loop reactor.

In another embodiment, the multiple entries for feeding hydrogen are positioned spatially separated from each other on the reactor. Preferably, the multiple feeding entries of hydrogen are positioned equidistantly along the reactor path in order to keep the hydrogen/monomer ratio substantially constant along the complete path of the reactor. Alternatively, the hydrogen feeding entries may be provided at non-equidistant positions on the reactor. Particular suitable positioning sites of hydrogen feeding may be chosen in function of reaction parameters, such as reaction temperature, hydrogen/monomer ratio, reactor pump activity, distribution of solids in the reactors, reactant flow in the reactor, etc. Preferably, the hydrogen feeds are positioned close to bottom or top elbows of the reactor.

In yet another embodiment, the present process further comprises separately controlling the flow rate of each, spatially separated, feed of hydrogen along the path of the loop reactor. In one embodiment, each hydrogen feeding line is provided with or connected with a separate flow controlling means for controlling the flow rate of hydrogen injection in the reactor. In another embodiment, the number of flow controlling means is lower than the number of means for feeding hydrogen. The multiple flow controlling means can be spatially separated, or they can be centralized and close to each other in space.

In a particularly preferred embodiment, the present process comprises reducing the variation in the hydrogen/monomer ratio between the ratio at the reactor inlet and the ratio at the reactor outlet, i.e. the point at which the reactor has been completely passed through. The present process comprises reducing the variation in the hydrogen/monomer ratio to a variation that is lower than 40%, and preferably lower than 30%, and more preferably lower than 20%, and even more preferably lower than 10%.

The present process is suitable for being applied to a single loop reactor.

The present process is also suitable for being applied to the first loop and/or to the second loop of a double loop reactor.

A process for the polymerization of ethylene monomer with one or more optional olefin co-monomer(s) in a double loop reactor, a second loop reactor being interconnected with a first loop reactor, comprises the steps of:

transferring polymer slurry comprising essentially liquid diluent and solid ethylene polymer particles from the first reactor to the second reactor, feeding reactants comprising ethylene monomer, diluent, one or more optional co-monomer(s) and/or a polymerization catalyst into the second reactor, further polymerizing said reactants in said second reactor to produce a polymer slurry comprising essentially liquid diluent and solid ethylene polymer particles;

allowing said polymer slurry to settle into one or more settling legs connected to the second reactor, and discharging the settled polymer slurry from said one or more settling legs out of the second reactor.

In one embodiment such process is further characterized in that it comprises the step of controlling the hydrogen/monomer ratio along the path of the first reactor by multiple, spatially separated, feeding of hydrogen along the path of the first reactor. Controlling the hydrogen/monomer ratio along the path of the first reactor allows controlling properties such as but not limited to molecular weight distribution of polymers particles, which are transferred from the first reactor to the second reactor, and/or of polymer particles, which are discharged from the second reactor. In particular, the invention provides a process, which permits to narrow the molecular weight distribution of the polymer particles which are transferred from the first reactor to the second reactor and/or which are discharged from the second reactor. When the hydrogen/ethylene ratio is not adequately controlled in the first reactor of a double loop system, polymer particles having unsatisfactory properties, especially with regard to their molecular weight distribution, will be transferred from the first reactor to the second reactor. As a result thereof, the polymerization reaction in the second reactor will also result in polymer particles that have unsatisfactory properties, in particular with regard to their molecular weight distribution. In accordance with the present invention, multiple hydrogen feeds are therefore provided on the first reactor of a double loop reactor.

In another embodiment, the process is characterized in that it comprises the step of controlling the hydrogen/monomer ratio along the path of the second reactor by multiple, spatially separated, feeding of hydrogen along the path of the second reactor. The present invention provides a process for controlling, and preferably narrowing, the molecular weight distribution of the polymer particles, which are discharged from the second polymerization reactor.

In yet another embodiment, the process is characterized in that it comprises the step of controlling the hydrogen/monomer ratio along the path of the first and the second reactor by multiple, spatially separated, feeding of hydrogen along the path of the first and the second reactor. The present invention provides a process for controlling, and preferably narrowing, the molecular weight distribution of the polymer particles, which are discharged, from the first and from the second polymerization reactor. In accordance with the present embodiment, polymer products having improved properties can be obtained as a result of a polymerization process under bimodal conditions, whereby polymers with different molecular weights are prepared in the different reactors. In practice, hydrogen is hereby fed via multiple entries in the reactor wherein low molecular weight polymer is prepared, but also in the reactor wherein high molecular weight polymer is prepared, although the amount of hydrogen required for the polymerization process in the latter reactor is very low.

According to a preferred embodiment of the present invention, the present process comprises providing at least two feeding entries of hydrogen along the path of the first and/or second reactor. In another preferred embodiment, the present process comprises providing at least three feeding entries of hydrogen along the path of the first and/or second reactor. In another preferred embodiment, the present process comprises providing at least four feeding entries of hydrogen along the path of the first and/or second loop reactor.

In another embodiment, the multiple entries for feeding hydrogen are positioned spatially separated from each other on the first and/or second reactor. Preferably, the multiple feeding entries of hydrogen are positioned equidistantly along the path of the first and/or second reactor. Alternatively, the hydrogen feeding entries may be provided at non-equidistant positions on the first and/or second reactor. Preferably, the hydrogen feeds are positioned close to bottom or top elbows of the first and/or second reactor.

In yet another embodiment, the present process further comprises separately controlling the flow rate of each, spatially separated, feed of hydrogen along the path of the first and/or second reactor. In one embodiment, each hydrogen feeding line is provided with or connected to a separate flow controlling means for controlling the flow rate of hydrogen injection in the first and/or second reactor. In another embodiment, the number of flow controlling means is lower than the number of means for feeding hydrogen. The multiple flow controlling means can be spatially separated, or they can be centralized and close to each other in space.

In a further embodiment, the invention provides a process, which further comprises multiple, spatially separated feeding of monomer and/or one or more optional olefin co-monomer(s) along the path of the loop reactor.

According to a preferred embodiment, the present process comprises providing at least two feeding entries of monomer and/or one or more optional olefin co-monomer(s) along the path of the loop reactor. In another preferred embodiment, the present process comprises providing at least three feeding entries of monomer and/or one or more optional olefin co-monomer(s) along the path of the loop reactor. In another preferred embodiment, the present process comprises providing at least four feeding entries of monomer and/or one or more optional olefin co-monomer(s) along the path of the loop reactor.

In another embodiment, the multiple entries for feeding monomer and/or one or more optional olefin co-monomer(s) are positioned spatially separated from each other on the reactor. Preferably, the multiple feeding entries of monomer and/or one or more optional olefin co-monomer(s) are positioned equidistantly along the reactor path. Alternatively, the monomer and/or one or more optional olefin co-monomer(s) feeding entries may be provided at non-equidistant positions on the reactor. Particular suitable positioning sites for (co-)monomer(s) feeding may be chosen in function of reaction parameters, such as reaction temperature, concentration of reactants, co-monomer/monomer ratio, reactor pump activity, distribution of solids in the reactors, reactant flow in the reactor, etc. Preferably, the (co-)monomer(s) feeds are positioned close to bottom or top elbows of the reactor.

The monomer and/or the one or more optional olefin co-monomer(s) reactants may be fed individually from each other, e.g. by separate feeding entries, or alternatively in conjunction with each other and at suitable ratios, e.g. through a common feeding entry.

When multiple feeding of monomer along the path of the reactor according to the present process, it is preferred to feed monomer in conjunction with a diluent. Preferably, the monomer/diluent ratio is lower than 5/1, and for instance 3/1 or 2/1. Ethylene is a gas. The reactor is preferably operated as full of liquid. Therefore it is preferred to inject ethylene together with diluent so that part of the ethylene is already dissolved in the diluent. The feed thus either comprises a liquid or a liquid with bubbles of ethylene.

When multiple feeding co-monomer along the path of the reactor, according to the present process, it is also preferred to feed co-monomer in conjunction with a diluent. Preferably, the co-monomer/diluent ratio is lower than 1/3, and for instance 1/5.

When multiple feeding monomer along the path of the reactor in conjunction with co-monomer according to the present process, the co-monomer/monomer ratio is preferably lower than 1/5, and for instance 1/10.

The multiple feeding entries of reactants such as (co-)monomer may be similar to or different from the feeding entries of hydrogen. The present invention may provide separate, multiple feeding entries of (co-)monomer, separate multiple feeding entries of hydrogen, common feeding entries of hydrogen and (co-)monomer, or any combination of such feeding entries on a loop reactor.

In an example, the present process comprises multiple, spatially separated, feeding of hydrogen, and single feeding of monomer and/or co-monomer. In another example, the present process comprises multiple, spatially separated, feeding of hydrogen; multiple, spatially separated, feeding of monomer; and single feeding of co-monomer. Multiple feeding of monomer and hydrogen may be performed either through the same or through different feeding entries, or a combination thereof. In still another example, the present process comprises multiple, spatially separated, feeding of hydrogen; multiple, spatially separated, feeding of co-monomer, and single feeding of monomer. The multiple feeding of co-monomer and hydrogen may be performed either through the same or through different feeding entries, or a combination thereof. In yet another example, the present process comprises multiple, spatially separated, feeding of hydrogen; multiple, spatially separated, feeding of monomer, and multiple, spatially separated, feeding of co-monomer. The multiple feeding of monomer, co-monomer, and hydrogen may be performed either through the same or through different feeding entries, or a combination thereof.

In another embodiment, the present process comprises separately controlling the flow rate of each spatially separated, feed of monomer and/or co-monomer along the path of the loop reactor. Therefore, in one embodiment each monomer and/or co-monomer feeding line may be connected to a separate flow controlling means for controlling the flow rate of monomer and/or co-monomer injection in the reactor. In such case, the number of flow controlling means preferably corresponds to the number of means for feeding monomer, and/or the one or more optional olefin co-monomer(s). In another embodiment, the number of flow controlling means is lower than the number of means for feeding monomer and/or co-monomer(s). The multiple flow controlling means can be spatially separated, or they can be centralized and close to each other in space.

In yet another embodiment, multiple injection of (co-)monomer may be applied to a single loop reactor. Multiple injection of (co-)monomer(s), as explained above, may also applied to the first loop and/or to the second loop of a double loop reactor.

In another embodiment, the invention relates to a polymerization loop reactor suitable for the polymerization of ethylene, with an optional olefin co-monomer, such as for instance hexene. Such a reactor may comprise a single loop reactor (see e.g. FIG. 1) or a double loop reactor (see e.g. FIG. 2), comprising a second loop reactor 2 being interconnected with a first loop reactor 1.

Figure 1:
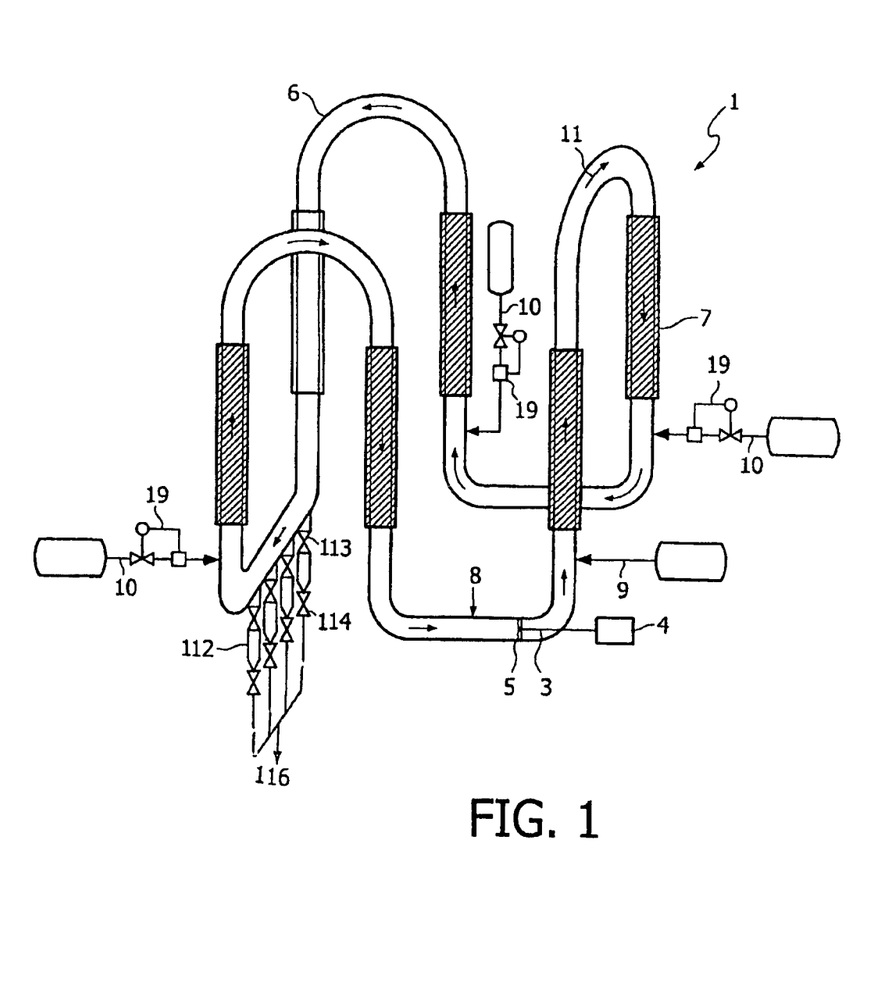
FIG. 1 is a schematic representation of a single loop reactor having multiple hydrogen feed points. Each hydrogen feeding entry is provided with a separate flow controlling means.

Referring now to FIG. 1, a single loop reactor 1 is represented comprising a plurality of interconnected pipes 6 defining a continuous flow path 11 for a polymer slurry. Said slurry consists essentially of ethylene, a polymerization catalyst, liquid diluent, preferably isobutane, and solid ethylene polymer particles. While the loop reactor 1 is illustrated with four vertical pipes, said loop reactor may be equipped with less or more pipes, such as 4 or more pipes, for example between 4 and 20 vertical pipes. The vertical sections of the pipe segments are preferably provided with jackets 7. Polymerization heat can be extracted by means of cooling water circulating in these jackets of the reactor. The reactor 1 preferably operates in a liquid full mode. Ethylene, optionally hexene, diluent such as isobutane, is introduced into the reactor 1 by means 9. Through this line 9 also hydrogen is introduced together with the other reactants. The reactor 1 is also fed with catalyst, optionally in conjunction with a co-catalyst or activation agent, by means of the conduit 8. In a preferred embodiment, this catalyst is a metallocene catalyst. In a preferred embodiment, catalysts are introduced upstream from the circulation pump 3 via line 8, while diluent, monomer, co-monomers, hydrogen and reaction additives are preferably introduced downstream of the circulation pump 3 via line 9. The polymerization slurry is directionally circulated throughout the loop reactor 1 as illustrated by the arrows 11 by one or more pumps, such as axial flow pumps 3. The pump may be powered by an electric motor 4. As used herein the term "pump" includes any device from compressing driving, raising the pressure of a fluid, by means for example of a piston or set of rotating impellers 5. According to the present invention, the pump is preferably of axial type. Polymer product may be removed from the loop reactor, by continuous or periodical discharge through one or more settling legs 112 along with some diluent. The settling legs 112 are provided with an isolation valve 113, preferably a ball valve, which can be closed when the reactor pressure falls below a chosen value. Further the settling legs 112 can be provided with product take off or discharge valves 114. Discharged polymer product is sent to a product recovery zone, for instance by means of conduit 116, where the polymer particles are separated from remaining reactants. The loop reactor illustrated in FIG. 1 comprises three means 10 for additionally feeding hydrogen in said reactor, besides line 9. Each means 10 for separately feeding hydrogen to the reactor 1 is connected to a flow controlling means 19.

Figure 2:
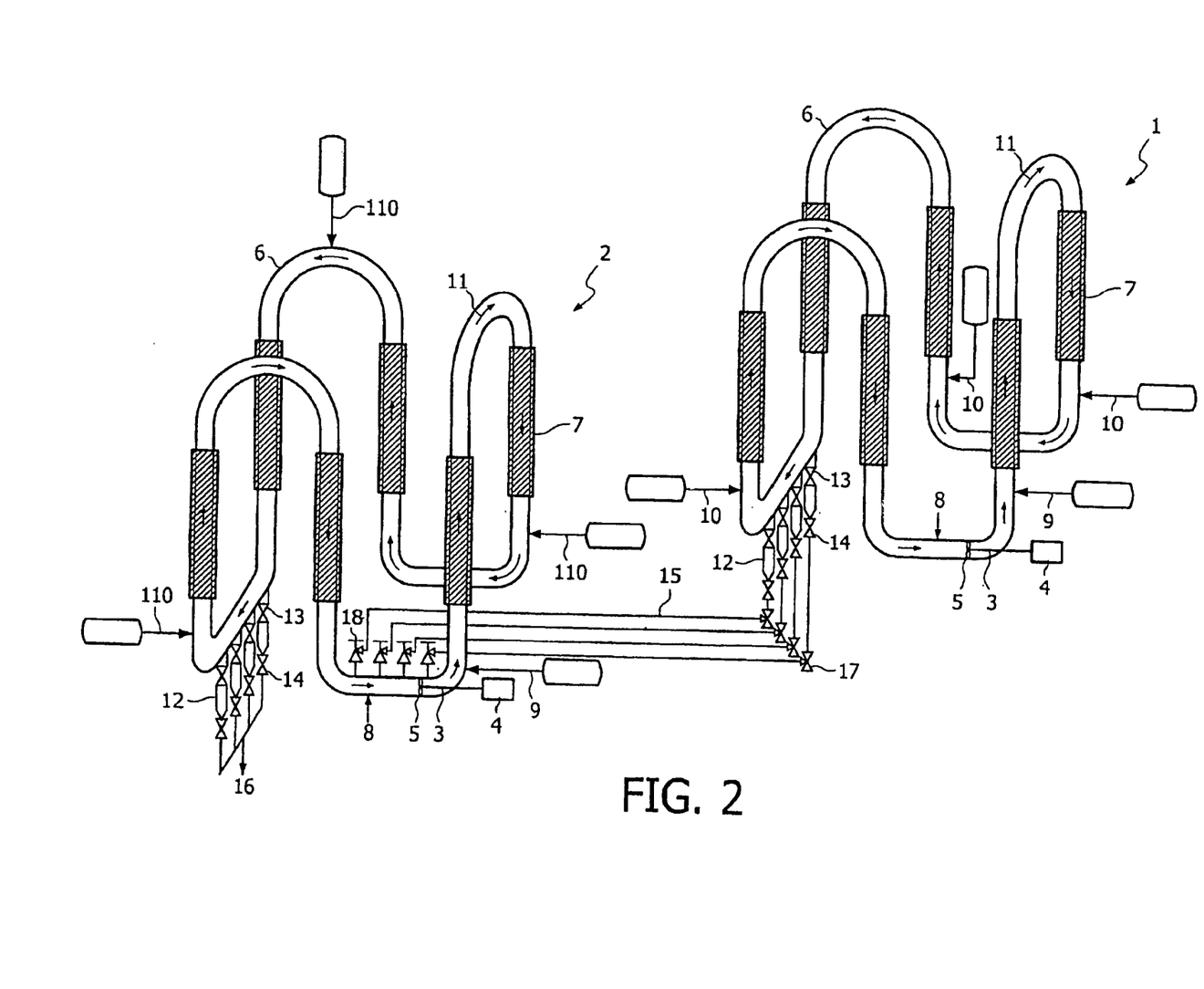
FIG. 2 is a schematic representation of a double loop polymerization reactor wherein multiple hydrogen feed points are provided on the first and on the second loop reactor.

FIG. 2 illustrates a double loop reactor wherein a first reactor 1 is interconnected with a second loop reactor 2. The polymerization slurry is maintained in circulation in the loop reactors 1, 2. Intermediate polymer slurry or polymer product may be removed from the loop reactors, by continuous or periodical discharge through one or more settling legs 12 along with some diluent. As illustrated in FIG. 2, polymer slurry settled in the settling legs 12 of reactor 1 may be removed by means of a three-way valve 17 to another reactor 2, to which it is transferred by means of one or more transfer lines 15. The transfer line 15 connects the three-way valve 17, provided at the exit of the settling leg 12 of one reactor 1, with the entry in the other reactor 2, where a piston valve 18 is provided. The settling legs 12 are provided with an isolation valve 13 preferably a ball valve, which can be closed when the reactor pressure falls below a chosen value. Further the settling legs can be provided with product take off or discharge valves 14. Discharging is performed in such a way that the volume discharged from a settling leg substantially corresponds to the volume of polymer slurry settled in said settling leg since its previous discharge. The discharge valve 14 may be any type of valve, which can permit continuous or periodical discharge of polymer slurry, when it is fully open. Polymer slurry settled in the settling legs 12 of reactor 2 may be removed to a product recovery zone, for instance by means of conduit 16.

The first loop reactor 1 illustrated in FIG. 2 comprise three means 10 for additional feeding hydrogen in said reactor, besides line 9. The second loop reactor 2 illustrated in FIG. 2 also comprises three additional hydrogen feeding means 110, besides line 9.

The single loop reactor and the first and/or second reactor of a double loop reactor may further comprise multiple means for feeding other reactants such as monomer and/or co-monomer. These additional feeding means may correspond to the feeding means for hydrogen 10, 110, or may comprise separate, feeding means different from the feeding means for hydrogen (not shown).

For reasons of brevity and clarity, conventional auxiliary equipment such as pumps, additional valves, and other process equipment have not been included in this description and the accompanying drawings as they play no part in the explanation of the invention, also additional measurement and control devices which would typically be used on a polymerization process have not been illustrated. In a preferred embodiment, it is to be understood that all lines or conduits applied in accordance with the present invention for feeding reactants may be provided, where necessary with flow measuring means.

EXAMPLES

Example A

Ethylene and 1-hexene were copolymerized in a slurry loop reactor in the presence of a supported metallocene catalyst under standard polymerization conditions using isobutane as diluent. The slurry loop reactor had a reaction volume of approximately 100 m$^3$ and a cycle time of ca. 45 s. The term "cycle time" is defined as the time it takes for a particle etc. to complete a full circuit around the polymerization reactor. The resulting ethylene-hexene copolymer had a target density of 0.934 g/cm$^3$ and target MI2 of 0.9 dg/min (measured according to ISO 1133, condition D, at a temperature of 190° C. and a load of 2.16 kg). Hydrogen, which was used as the chain termination agent, was fed into the loop reactor through two spatially separated hydrogen feeding entries. These two feeding entries were spaced along the length of the loop reactor such that the minimal distance between the two feeding entries was about one third of the length of the loop reactor.

Example B

Comparative Example

Ethylene and 1-hexene were copolymerized in the same manner as described for example A with the exception that only one feeding entry for hydrogen was used to feed hydrogen into the loop reactor.

Results

A summary of the results is shown in table 1. More detailed results relating to reactor temperature and melt index of the ethylene-hexene copolymer are shown in FIGS. 3 and 4.

TABLE 1

|  | Unit | Example A | Example B (comparative) |
| --- | --- | --- | --- |
| Number of hydrogen feeding entries |  | 2 | 1 |
| MI2 |  |  |  |
| Target | dg/min | 0.90 | 0.90 |
| Average for the production campaign | dg/min | 0.89 | 0.73 |
| Standard deviation | dg/min | 0.05 | 0.28 |
| Standard deviation of the difference between actual and targeted reactor temperatures | ° C. | 0.15 | 0.65 |

Figure 3A:
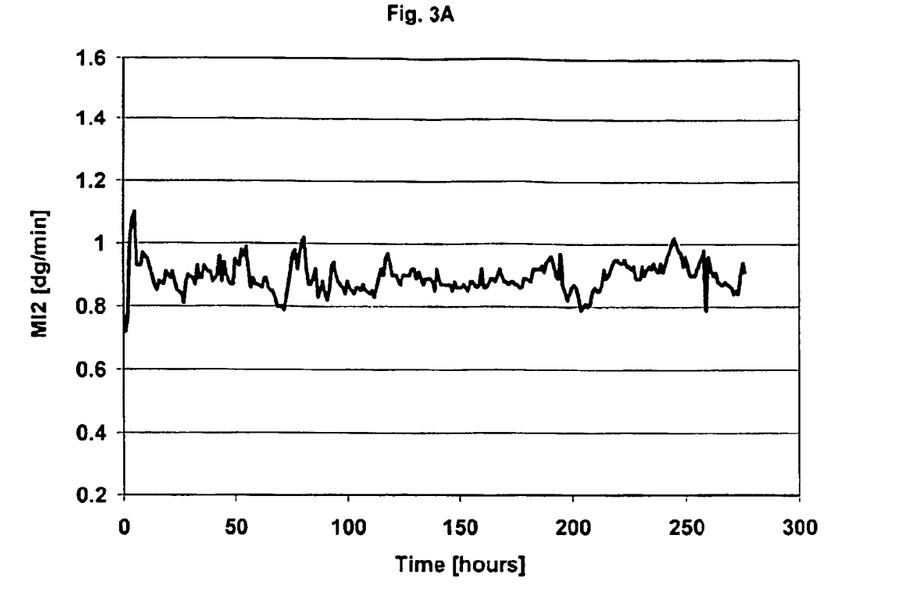
FIG. 3A shows the evolution of melt index MI2 during a production campaign using two spatially separated hydrogen feeding entries.
Figure 3B:
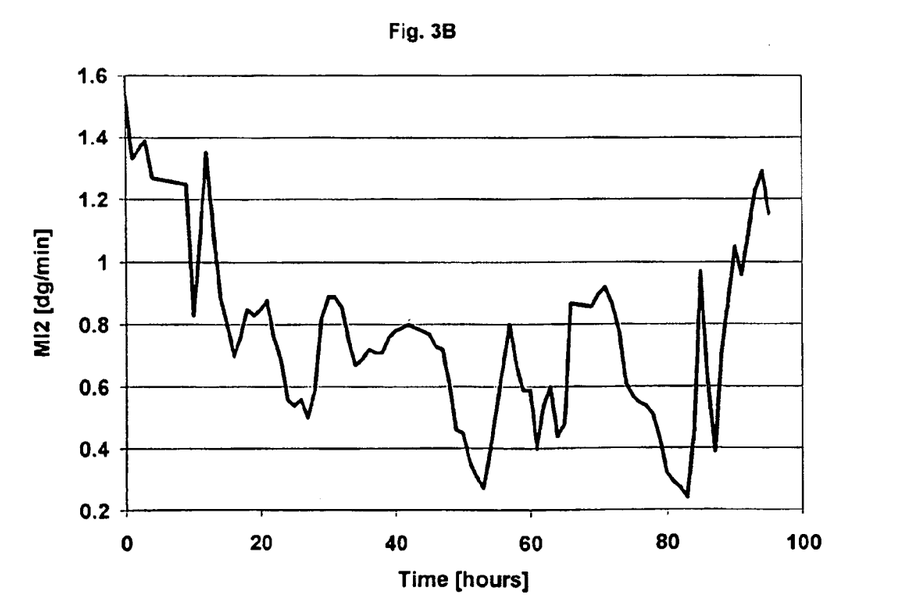
FIG. 3B shows the evolution of melt index MI2 during a production campaign using only one hydrogen feeding entry.
Figure 4A:
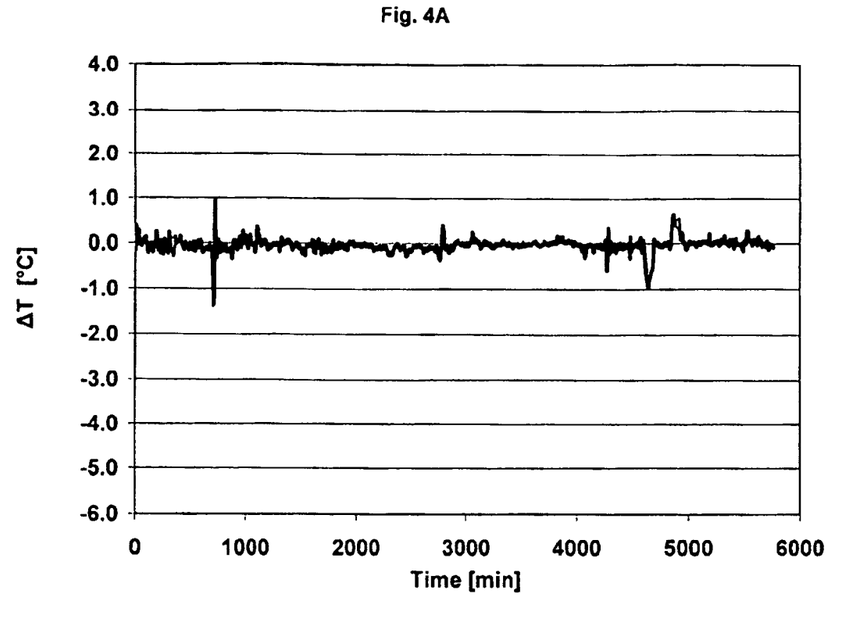
FIG. 4A shows the temperature deviation ΔT of actual reactor temperature and targeted reactor temperature during a production campaign using two spatially separated hydrogen feeding entries.
Figure 4B:
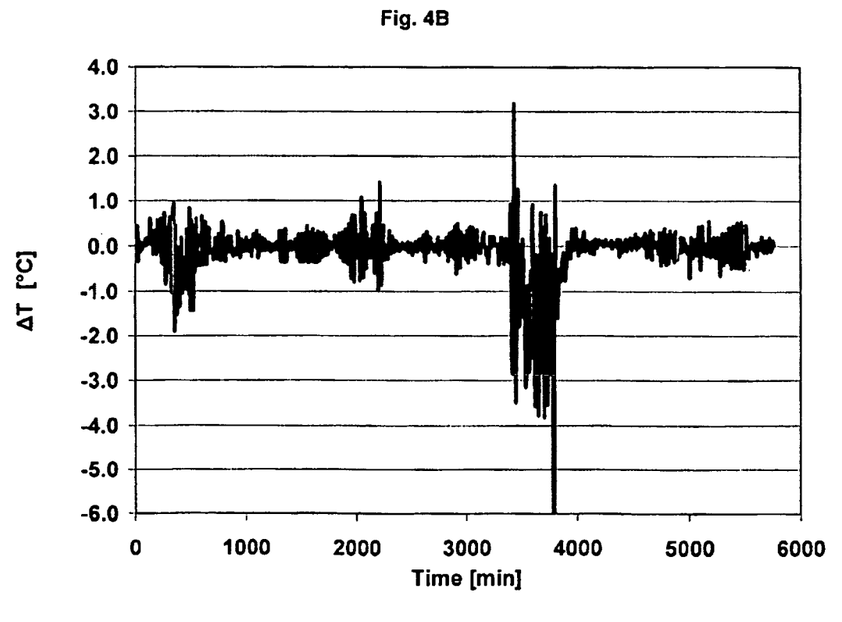
FIG. 4B shows the temperature deviation ΔT of actual reactor temperature and targeted reactor temperature during a production campaign using only one hydrogen feeding entry.

The evolution of melt index MI2 for example A, i.e. with two spatially separated hydrogen feeding entries, is graphically illustrated in FIG. 3A. The graph shows that the melt index during a prolonged industrial production campaign was between 0.8 and 1.0 dg/min with the target being 0.9 dg/min. The average of all the melt index data obtained during the production campaign is 0.89 dg/min, thus extremely close to the targeted value. Results from example B, i.e. with only one hydrogen feeding entry, are shown in FIG. 3B. As shown in the graph the melt index values during an industrial production campaign were in the range from about 0.2 to 1.4 dg/min, with the average over the whole production campaign being 0.73 dg/min.

Visual comparison of the melt index evolution for examples A and B as illustrated in FIG. 3A resp. FIG. 3B shows that the melt index control is much better for example A, i.e. with two hydrogen feeding entries used for feeding hydrogen to the reactor. This visual impression is confirmed by the standard deviations of the melt indices, which is 0.05 for example A, i.e. with two hydrogen feeding entries, and 0.28 for example B, i.e. with only one hydrogen feeding entry.

Surprisingly, the use of two hydrogen feeding entries instead of only one also resulted in a much better control of the reaction conditions in the slurry loop reactor. The improvement in reaction control can for example be seen in the temperature fluctuations in the reactor. FIG. 4A shows the difference ΔT between actual and targeted reactor temperatures for example A, i.e. with two spatially separated feeding entries. FIG. 4B shows the same difference ΔT for example B, i.e. with only one hydrogen feeding entry. Comparison of the curve for example A, which is given in FIG. 4A, with the curve for example B, which is given in FIG. 4B, shows that the temperature control with two spatially separate feeding entries is much better than with only one hydrogen feeding entry. This can also be seen by comparing the respective standard deviations of the difference ΔT between actual and targeted reactor temperatures, which is 0.15° C. for example A, i.e. with two spatially separated hydrogen feeding entries, and 0.65° C. for example B, i.e. with only one hydrogen feeding entry.

In conclusion, the use of additional hydrogen feeding entries leads to a drastic reduction in the fluctuations of the melt index of the polymers produced in a polymerization reactor. In particular, the use of additional hydrogen feeding entries leads to an improved melt flow stability in polymerizations using a hydrogen-sensitive polymerization catalyst, such as for example a metallocene-based catalyst. This, in turn, will allow these polymers to be converted into shaped articles, such as for example film, with less attention to batch-to-batch property differences.

In consequence, the use of additional hydrogen feeding entries leads to a product with better homogeneity. In particular, this results in strongly reduced number of gels. This in turn will allow the conversion of the so-produced polymers in shaped articles, such as for example film, with improved properties.

Furthermore, the use of additional hydrogen feeding entries allows for much better control of the polymerization conditions in the polymerization reactor, such as for example improved temperature control. Consequently, the improved melt index control as well as the improved control of polymerization conditions will result in polymers with improved product consistency.

It will be clear to the person skilled in the art that the effects of using additional hydrogen feeding entries, on for example the melt flow stability of the produced polymers and the control of the polymerization conditions, will be more pronounced the longer the polymerization reactor is. In other words, the effect will be more pronounced for a reactor with a longer "cycle time", i.e. the time it takes for a particle etc. to complete a full circuit around the polymerization reactor.

The invention claimed is:

1. A double loop reactor system comprising:
a first loop reactor and a second loop reactor in series having a flow path for a polymer slurry, wherein the polymer slurry comprises monomer, one or more optional co-monomers, a polymerization catalyst, liquid diluent and solid ethylene polymer particles;
multiple feedings for feeding hydrogen into the double loop reactor, which are positioned spatially separated along a path of the double loop reactor, wherein the location of the multiple feedings for feeding hydrogen are chosen by a function of hydrogen/monomer ratio;

a pump suitable for maintaining the polymer slurry in circulation in said reactor;

one or more controllers adapted to control a hydrogen:monomer along the flow path by feeding hydrogen into the multiple feedings for feed hydrogen and reducing the variation in the hydrogen:monomer ratio between the ratio at the double loop reactor inlet and at the double loop reactor outlet to a variation that is lower than 40%;

one or more settling legs connected to the pipes of the double loop reactor for settling of polymer slurry; and one or more lines for discharging settled polymer slurry out of the double loop reactor.

2. The loop reactor system of claim 1, wherein the one or more controllers comprise a plurality of centralized flow controllers.

3. The double loop reactor system of claim 1, wherein the multiple feedings of hydrogen are disposed at equidistant points along the flow path.

4. The double loop reactor system of claim 1, wherein the polymerization catalyst comprises a metallocene catalyst.

5. The double loop reactor system of claim 1, wherein each feeding of hydrogen into the polymerization loop reactor is controlled by a separate controller.

6. The double loop reactor system of claim 1, wherein there are at least four feedings of feeding hydrogen.

7. The double loop reactor system of claim 1 further comprising multiple feedings of monomer into the double loop reactor, which are positioned spatially separated along a path of the double loop reactor.

8. The double loop reactor system of claim 7 further comprising a single feeding of comonomer into the double loop reactor.

9. The double reactor system of claim 1 further comprising multiple feedings of comonomer into the double loop reactor, which are positioned spatially separated along a path of the double loop reactor.

10. The double loop reactor system of claim 9 further comprising a single feeding of monomer into the double loop reactor.

11. The double loop reactor system of claim 7 further comprising multiple feedings of monomer into the double loop reactor, which are positioned spatially separated along a path of the double loop reactor.

12. The double loop system reactor of claim 1, wherein the multiple feedings of hydrogen into the double loop reactor comprise two feedings of hydrogen into the double loop reactor, and wherein a minimal distance between the two feedings of hydrogen into the double loop reactor is about one third of a length of the double loop reactor.

13. The double loop reactor system of claim 1, wherein the multiple feedings of hydrogen into the double loop reactor are positioned close to bottom elbows and top elbows of the double loop reactor.

* * * * *